United States Patent [19]

Sternberg

[11] 4,184,963
[45] Jan. 22, 1980

[54] IMMERSIBLE MOLECULAR FILTER UNIT AND PROCESS OF MAKING IT

[75] Inventor: Shmuel Sternberg, Lexington, Mass.

[73] Assignee: Millipore Corporation, Bedford, Mass.

[21] Appl. No.: 846,330

[22] Filed: Oct. 28, 1977

[51] Int. Cl.$^2$ ...................... B01D 31/00; B01D 13/04
[52] U.S. Cl. ................................ 210/321 R; 210/457; 210/460; 210/490; 210/497 R; 427/244; 427/246
[58] Field of Search ................ 210/22, 321 R, 433 M, 210/457, 483, 497, 490, 500 M, 460; 427/246, 245, 244; 55/16, 158

[56] References Cited

U.S. PATENT DOCUMENTS

| | | | |
|---|---|---|---|
| 3,156,645 | 11/1964 | Chapin et al. | 210/120 |
| 3,494,470 | 2/1970 | Banfield | 210/321 R |
| 3,556,992 | 1/1971 | Massucco | 210/23 |
| 3,580,841 | 5/1971 | Cadotte et al. | 210/23 |
| 3,608,730 | 9/1971 | Blaha | 210/321 R |
| 3,642,141 | 2/1972 | Hobson, Jr. | 210/323 |
| 3,676,193 | 7/1972 | Cooper et al. | 117/94 |
| 3,762,566 | 10/1973 | Del Pico | 210/490 |
| 3,767,502 | 10/1973 | Ishii et al. | 210/500 M |
| 3,772,072 | 11/1973 | Brown et al. | 117/144 |
| 3,855,122 | 12/1974 | Bourganel | 210/23 |
| 4,100,064 | 7/1978 | Gale | 210/23 H |

Primary Examiner—Charles N. Hart
Assistant Examiner—David R. Sadowski
Attorney, Agent, or Firm—Irons and Sears

[57] ABSTRACT

Covers an immersible molecular filter unit having a body that is formed from a porous polymeric material of generally cylindrical shape, preferably rounded at least at one of its ends. A tubular connector is mounted at one end of this body, with a bore that communicates with the porous network of the body. An anisotropic membrane encapsulates the body and is formed with an integral collar portion that engages about a portion of the connector, where it projects from the body, in substantially fluid-tight fashion. Preferably the membrane, which is formed in situ, is shrunk about the tube and the body, and is solvent welded to the connector.

This unit is formed by dipping the body and the juxtaposed connector in a polymer casting solution, to encapsulate the porous body and a part of the connector. The dip-coating unit is then converted to an anisotropic membrane. The preferred way to do this is immersion in a liquid that is not a solvent for the cast polymer, but that is miscible with the solvent of the casting solution, to cause formation of a highly anisotropic structure. Preferably, this is accompanied by simultaneous shrinking of the applied coating and solvent welding of the collar portion of the coating to the tube. The viscosity of the casting solution and the porosity of the body are such that there is substantially no penetration of the casting solution into the porous structure of the body.

11 Claims, 4 Drawing Figures

IMMERSIBLE MOLECULAR FILTER UNIT AND PROCESS OF MAKING IT

FIELD OF THE INVENTION

This invention relates to an immersible molecular filter unit and a process of making it. The new unit is characterized by simplicity of construction, lightness in weight, sturdiness, and reliability. The process of making it is relatively simple, lends itself to mass production techniques, and facilitates testing for integrity.

BACKGROUND

The copending patent application of F. S. Emmer and Carl M. Good, Ser. No. 763,231, filed Jan. 27, 1977, describes an immersible molecular filter unit that has a generally cylindrical core with an underdrain structure, about which a semi-permeable membrane is heat sealed. This unit provides a unique combination of easy operation, versatility and low cost to laboratory-scale molecular concentrations and separations. The unit is ideal for concentrating proteins, viruses, and colloids; for removing salts, buffers, and solvents from solutions; for deproteinizing samples; and for separating out unbound ligands.

To use this separator, it is simply immersed in the liquid that is to be processed, and it is then connected through tubing to a source of vacuum. A pre-evacuated, stoppered test tube provides a convenient source of vacuum and a clean receptacle for the collection of filtrate. Atmospheric pressure forces the liquid phase of the material in which the separator is immersed through the membrane. The separations that are achieved depend upon the membrane characteristics.

This unit has been well received. The present invention seeks to improve on that unit with respect to greater ease of testing for integrity, greater ease of manufacture, and superior reliability.

SUMMARY OF THE INVENTION

An immersible molecular filter unit that is constructed in accordance with the invention has a microporous polymeric body. The porous body preferably is formed from a sintered polymer such as, for example, polyethylene, having pores of quite uniform size, up to about 100 microns in size. This body also has a bulk density of less than about 0.5 gms/cm$^3$, so that it is very light in weight.

For many applications, the porous body is in generally cylindrical form. A connector is secured to one end of the body. The connector includes or communicates with a tubular conduit, whose bore is in communication with the porous network of the body. A highly anisotropic membrane encapsulates the body and is formed with a collar portion that grips the connector, where it projects from the body, in fluid-tight fashion.

This unit is light in weight, compact, and preferably is shaped for insertion into the rounded bottom parts of test tubes and other vessels, with a shape conforming generally to that of the vessel in which it is inserted.

To make this unit, the connector is juxtaposed with the porous body in operative disposition, and this assembly is then dipped in a polymer casting solution, to form a coating that completely enrobes the body and a part of the connector where it projects from the body. After allowing any excess to drip off, and with a minimum of delay, the coating is converted to a highly anisotropic structure, preferably by immersion in water or other liquid that is not a solvent for the polymer but that is miscible with the solvent in the casting solution. After the anisotropic, porous structure has been essentially fully formed, suction may be applied to the tube, to draw the water or other coagulating liquid through the formed membrane and through the porous network of the body into the tube, to remove any residual casting solvent from the membrane coating.

Generally, the formation of the porous structure of the membrane coating is accompanied by shrinkage, or a tendency toward shrinkage. If the body is sufficiently rigid, the membrane forms a snugly fitting skin about the body. However, the collar portion, that is engaged about the connector, tends to shrink sufficiently to grip the connector with enough pressure for firm frictional engagement.

Preferably, the material from which the connector is made is selected so that the solvent of the casting solution exerts a slight dissolving action on it, to form a solvent weld between the collar of the membrane and the underlying portion of the connector. This results in an essentially unitary structure that is fluid-tight at the seal. To retain its porous structure, the material from which the body is made must be inert to the casting solvent.

To use this unit, it is connected in any convenient fashion to a source of vacuum. The unit is then inserted into the liquid that is to be processed. For example, if the liquid is in a test tube, the unit is simply inserted into the liquid in the test tube, and the liquid will begin to pass through the membrane. The kind of separation that is achieved will depend upon the characteristics of the membrane.

Generally, the polymer in the casting solution is selected so that the membrane is hydrophilic, so that as long as the membrane is wet, it will not pass gas. Accordingly, filtration will continue automatically so long as the unit is connected to a source of vacuum, even though the level of liquid drops to a level that exposes a portion of the membrane to the atmosphere.

Units constructed in accordance with the invention can be cleaned easily after use, and are easily stored. They can be used repeatedly to minimize the cost of any unit operation.

DETAILED DESCRIPTION OF THE INVENTION

In this application, all parts and percentages are by weight, and all temperatures are expressed on the Celsius scale, unless expressly stated to be otherwise. All viscosity measurements are as determined on a Brookfield viscometer at a temperature of 25° C. using a rotor speed of six rpm., spindle no. 4, unless stated otherwise.

Figure 1:
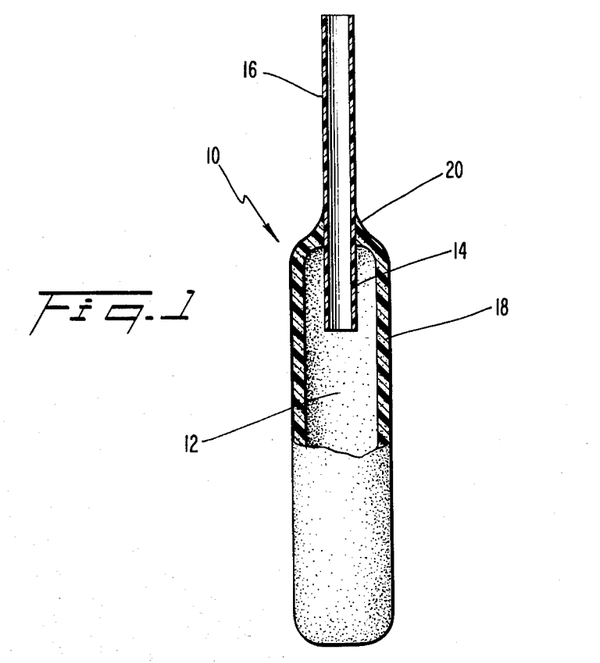
FIG. 1 is a side elevation, partly in section, on an enlarged scale, of an immersible filtration unit constructed in accordance with one embodiment of the present invention.
Figure 2:
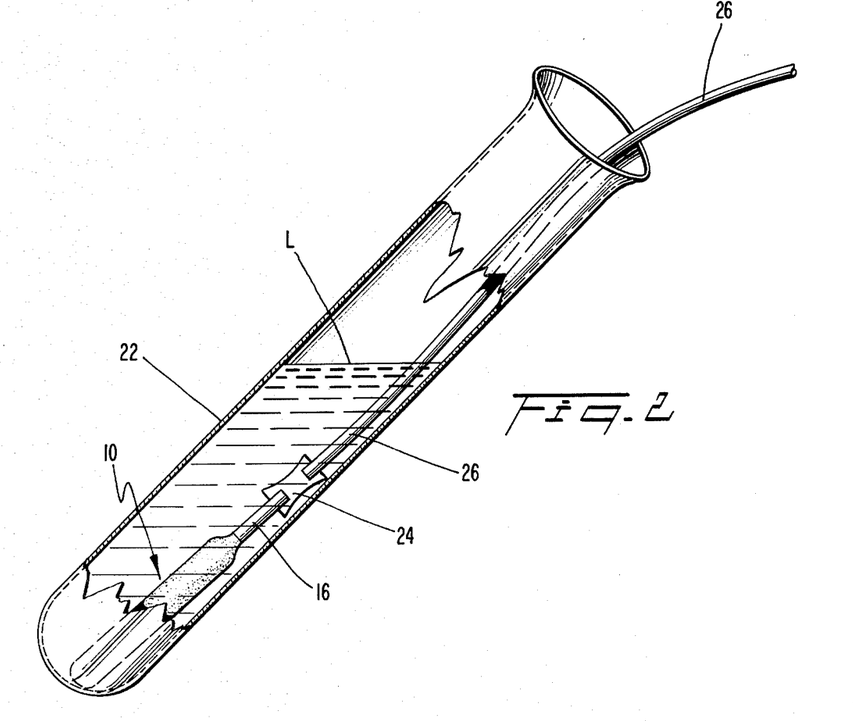
FIG. 2 is a side elevation, partly broken away, of a test tube containing some liquid to be filtered through the unit, the unit being immersed in the liquid and connected through tubing to a source of vacuum (not shown)

Referring now in detail to the drawings by numerals of reference, and particularly to FIGS. 1 and 2, the numeral 10 denotes generally a molecular filter unit constructed in accordance with one embodiment of this invention. This unit 10 has a porous body 12 of generally cylindrical configuration which is formed with rounded ends and is essentially free from sharp edges. The porous body 12 is made from sintered polyethylene and has a mean pore size of about 35 micrometers. The bulk density is about 0.316 gms/cm$^3$. While these represent preferred characteristics, variation is possible.

The porous body 12 is formed at one of its ends with a generally cylindrical bore 14. The lower end of a tube 16 is inserted in this bore and is seated against the bottom of the bore.

A highly anisotropic membrane 18 is snugly disposed in encapsulating fashion about the body 12 and is formed with a collar portion 20 that engages about a part of the tube 16 where the tube projects from the bore 14.

To make this unit in accordance with one preferred embodiment of the invention, a polymer casting solution was made up from a commercially available polyether sulphone, in N-methyl-2-pyrolidone, to have a viscosity of about 1,000 cps.

The subassembly of the tube and porous body was then dipped in the polymer casting solution, so that the casting solution coated and encapsulated the entire body and formed a collar about a portion of the tube, where it projected from the body. The coated subassembly was then removed from the casting solution, and any excess solution was permitted to drip off. It was then promptly immersed in water, to cause the formation of a highly anisotropic structure in the coating. This occurs as the water leaches out the solvent from the coating, and itself penetrates the coating.

The formation of the anisotropic membrane structure occurs very rapidly. It is essentially complete within less than about one minute. The unit may be left immersed in the water bath for as long as is convenient, however, once the anisotropic structure is completely formed.

Shortly after immersion in the water bath, and preferably as soon as gelation of the coating had taken place, vacuum is applied to the tube, to cause water from the water bath to pass through the membrane, through the porous network of the body, and thence to pass out through the tube. The passage of water through the membrane extracts any residual solvent from the membrane, and thus accelerates and makes complete the formation of the anisotropic structure and at the same time flushes out any residual solvent, whose presence might cause some eventual deterioration of the anisotropic structure of the membrane if left in place.

After all the solvent has been extracted, it is preferred to draw glycerine into the membrane by the application of suction, then expel it by the application of gentle pressure, to bathe the entire surface, internal and external, of the membrane in the glycerine. This exerts a desirable preservative effect upon the porous structure, as is known in the art. The unit is then dried and packaged.

To use a unit of this kind, a liquid material L (FIG. 2) that is to be processed is placed in a test tube 22. The unit 10 is then connected in any convenient manner, as by a tubular nipple 24, to a longer piece of tubing 26 that may be connected to any convenient source of vacuum. The unit 10 is then immersed in the liquid. Filtration begins at once and continues so long as there is a liquid phase that can be separated out. The rounded shape of the unit permits it to remain in contact with the liquid that is to be processed at the bottom of the test tube, so long as there is any such liquid in the test tube.

The thickness of the membrane generally will not exceed about 300 micrometers. The thickness is controlled by the viscosity of the casting solution, and also by the time that is permitted for drainage, before the coated assembly is placed in the formation bath that converts the coating to a highly anisotropic membrane. In FIG. 1, the thickness of the membrane has been exaggerated relative to the diameter of the body, for ease of illustration. In a typical unit, the diameter of the body would be less than one-half inch, with specific diameters that have been used, for example, being 0.375 inches and 0.405 inches.

Figures 3, 4:
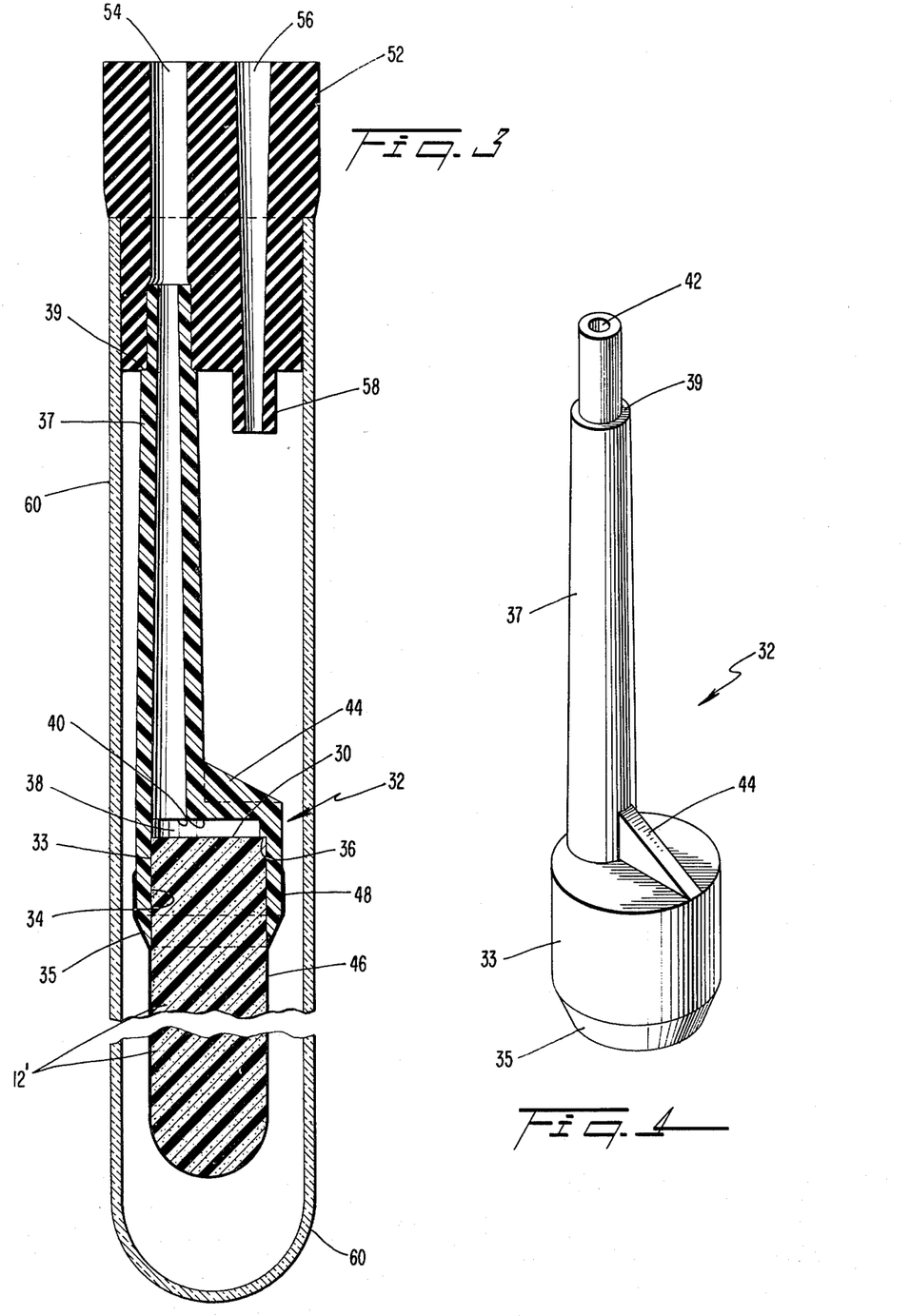
FIG. 3 is a fragmentary cross-section, on an enlarged scale, of a unit constructed in accordance with another embodiment of the present invention, that is particularly adapted for constant volume separations, the unit being shown assembled in a test tube, as it would be for use.
FIG. 4 is a perspective view of the end cap of the unit of FIG. 3.

Referring now particularly to FIG. 3, a slightly modified form of construction has been found to be advantageous, and is therefore preferred, for constant volume filtration operations as well as for some general filtration applications. In this embodiment of the invention, the sintered, porous polyethylene body 12' is rounded at its lower end but is squared-off at its upper end 30. A molded polystyrene cap 32 is seated over the upper end 30 of the body. This cap 32 is formed with a generally cylindrical recess 34, that is reduced in diameter at its upper end to provide a shoulder 36 against which the upper end of the body 12' abuts. This provides a clearance space 38 between the upper end 30 of the body 12' and the bottom 40 of the cup-shaped cylindrical recess in the molded cap 32.

The end cap 32 has a lower portion 33 that is generally cylindrical but whose lower end 35 is tapered to form a feather edge, for a purpose to be described presently.

The cap 32 is also formed with an integral, upstanding tubular extension 37, that has a bore 42 that extends throughout its length and that communicates with the clearance space 38. The cap is also formed with a generally triangular-shaped web portion 44.

To make the unit, the upper end 30 of the porous body is inserted into the cup-shaped recess in the cap, and this assembly is inserted, as previously described, in a polymeric casting solution for a few seconds. It is then withdrawn, and any excess is permitted to drip off. The coated part is then immersed in water for solvent extraction and formation of the anisotropic membrane structure. The membrane 46 thus formed includes a collar portion 48 at its upper end, that extends about the lower portion 33 of the cap, gripping it in fluid-tight fashion. Preferably, the solvent of the casting solution is selected so that it exerts a solvent action on the molded cap, to produce solvent-welding between the collar portion 48 and the underlying portions of the cap. The tapered part 35 at the lower end of the cap forms a feather edge to minimize unevenness in the applied polymeric coating and to avoid the introduction of stress into the membrane because of irregularities.

To use this unit, it is assembled with a special stopper 52. This stopper has a pair of bores 54 and 56 respectively. The upper end of the tube 37 is recessed slightly to provide a shoulder 39 to abut against the lower face of the stopper 52 when the upper end of the tube 37 is inserted in the bore 54 of the stopper. The stopper 52 is formed at the lower end of the other bore 56 with a short projecting nipple 58, for a purpose to be described presently.

The stopper 52, with the unit projecting beneath it, is then inserted in a test tube 60, whose dimensions are such that there is little clearance between the unit and the inner surface of the tube 60. When this assembly is used for constant volume filtration, in the manner described in my copending patent application Ser. No. 880,950, filed Feb. 24, 1978, one end of a length of tubing (not shown) is inserted in the bore 54, and the other end of that tubing is connected to a source of vacuum. Liquid in the tube immediately begins to pass through the membrane to be filtered. To maintain constant volume, a second liquid, such as a buffer solution, is dropped into the interior of the test tube 60 through a conduit member of some sort (not shown) that is inserted in the bore 56 of the stopper. The buffer or other liquid passes through the bore 56, and the drops of the liquid leaving the end of the nipple 58 impinge upon the upper edge of the web 44, to insure a more even distribution of the liquid about the interior of the test tube 60 than would be possible if the web 44 were not present.

GENERAL

The material from which the porous body is made may be substantially any material that is essentially inert with respect to the polymer casting solution. The preferred body material is sintered polyethylene having a pore size of about 30 to 40 micrometers and a bulk density of about 0.3 gms/cm$^3$. When using sintered polyethylene, best results are obtained when the average pore size is below about 100 micrometers, preferably in the range from about 20 micrometers to about 60 micrometers. The bulk density is preferably below about 0.5 gms/cm$^3$, and more preferably in the range from about 0.25 to about 0.35 gms/cm$^3$.

All of the materials from which the unit is made should, of course, be selected to be inert with respect to materials that are to be processed by the unit.

The tube 16 of FIGS. 1 and 2 may be made from any convenient material that is useful for tubing, but preferably is semi-rigid and easily formed to close tolerances to permit snug fitting within the bore of the porous body. Most preferably, the material from which it is made is a synthetic polymeric material that is at least slightly soluble in the solvent of the polymer casting solution, to permit solvent welding. A semi-rigid material is preferred to facilitate handling of the unit, particularly during manufacturing operations, but also in subsequent use.

The membrane may be formed from any one of a wide variety of membrane-forming polymers, including, for example, cellulose esters, polysulfones, polyether sulfones, polyaryl sulfones, polyphenylene oxide, polyvinyl chloride, polycarbonates, and the like. The selected polymer is simply dissolved in a suitable solvent, to make the necessary polymer casting solution. The viscosity of the polymer casting solution must be matched to the porosity of the body, so that upon dip-coating the body in the casting solution, and in subsequent operations, there is substantially no penetration of the casting solution into the porous structure of the body. The viscosity of the casting solution is determined by several factors, that include, among others, the molecular weight of the polymer that is selected, the concentration of the polymer in the casting solution, and the solvent that is selected. Generally, a viscosity in the range from 500 to 5,000 cps. is suitable. Normally the dip-coating is carried out at room temperature. Temperature is an obviously important parameter with respect to viscosity, and higher temperatures may be used for casting if desired.

When the casting solution is prepared from a polyether sulfone dissolved in N-methyl-2-pyrrolidone, and the sintered polyethylene body has pores having an average size of about 20 to 40 micrometers, and has a bulk density of about 0.3 gms/cm$^3$, the optimum viscosity is about 1,000 cps. Changes in any of these important variables will affect the other variables. For example, if the sintered polyethylene body is selected to have a bulk density of about 0.562 gms/cm$^3$, other conditions being those just mentioned, a 75% lower water flux is observed. Similarly, when a lower viscosity polymer casting solution is employed, changes in procedure are required to accommodate it, such as the use of an extremely fast procedure, or the acceptance and use of a membrane structure that is exceedingly thin and that is therefore weak and prone to leakage. Too high a viscosity may result in the production of an uneven coating, loss of flux, and membrane brittleness.

While the viscosity of the coating solution and the porosity of the body are important factors in avoiding the penetration of the casting solution into the body, the gel time and application temperature of the casting solution are also very important. Penetration is to be avoided because when tendrils extend from the membrane down into the porous structure of the body, there is a correspondingly decreased frontal area presented to a fluid that is being processed and that must flow transversely through the region, with a consequent restriction on flux. This may be a serious limitation with a highly anisotropic membrane that would characteristically exhibit relatively low flux through its skin in any case.

The dip-coating production process of the present invention can be applied to porous bodies having a variety of shapes. A cylindrical body form with at least one rounded end is preferred, for laboratory applications where the liquids to be processed may conveniently be placed in test tubes. However, for other purposes, other shapes may be desirable. Most membrane materials have a tendency to shrink upon membrane formation, and the extent of shrinkage to some extent limits the geometry of the body that may be employed.

For solvent welding between the membrane and the tube, the tube and membrane are either made from the same polymer or are compatible, so that they can adhere. However, the shrinkage that normally occurs with most plastics upon membrane formation ordinarily will produce a fluid-tight friction fit between the membrane and the tube. When a polymer is selected that does not shrink or that does not shrink enough to produce a good friction fit, solvent welding should be employed to produce the desired fluid-tight joint. Preferably, both shrinkage and solvent welding are employed to insure fluid tightness.

The rate at which the water or other formation bath liquid is drawn through the membrane can be employed to control the characteristics of the membrane that is produced. If the water is drawn through the coating rapidly, membrane formation occurs rapidly and usually with the formation of a very tight skin at the interface between the coating and the formation bath. Conversely, when the rate at which water is drawn through the coating is rather slow, the porous structure of the membrane is formed more slowly and more openly. Generally, the membrane is highly anisotropic. However, it may be microporous rather than skinned, if such a coating is desired, upon modification of the formation bath by the addition of a large proportion of solvent, as is known in the art.

Ordinarily, membranes that are highly anisotropic, that are produced in the manner discussed above, will have nominal molecular weight limits, that is, molecular weight limits at and above which most species of molecules are efficiently retained by that membrane, in the range from about 10,000 to about 20,000.

The use of vacuum to draw the liquid of the quench or formation bath through the membrane achieves rapid removal of any residual solvent, speeds curing time, results in a more uniform cure, and removes any uncured polymer. This extraction step should be continued until all of the solvent is removed. Thereafter, the unit is removed from the formation bath and immersed in a bath containing glycerine or a solution of glycerine, such as, for example, a 10% solution of glycerine in water. The final step is the application of mild internal pressure on the unit, to expel excess glycerine or glycerine solution. Air pressure on the order of 3 to 5 psi. ordinarily is adequate to expel the material as desired. The residual glycerine exerts a well-known, beneficial effect on the membrane during storage. When the unit has the structure illustrated in FIGS. 1 and 2, and the diameter of the porous body is less than one-half inch, the amount of water that is drawn through the membrane may be relatively small, on the order of 20 cc., for example, drawn through the membrane after it has been immersed in the water bath for about five minutes or so. After the water has been drawn through the membrane, an additional 10 cc. of an aqueous 10% solution of glycerine is drawn through the membrane, for stabilization, and the membrane is then dried.

For mass production, a plurality of subassemblies of tubes and bodies may be connected to a single manifold, like the bristles on a brush. All may then be dip-coated simultaneously, allowed to drip at the same time, and immersed in the formation bath as a unit. With either the tube-type or cap form of connector, the fit with the body should be snug to permit mechanical handling during manufacturing and use.

Whether the units are produced individually or by a mass production technique, the use of vacuum to draw the formation bath liquid through the coating to develop the anisotropic structure can provide an integrity test. If the individual tubes are transparent at some point above their collar coatings, any air bubbles that appear in the filtrate will be readily apparent upon inspection (an air bubble would indicate the presence of a break in the membrane). Alternatively, the formation bath liquid may contain a colored material of high molecular weight that will not pass an intact membrane, so that its passage will indicate a break or rupture.

The application of gentle air pressure to the membrane from the porous body, to expel the glycerine or glycerine solution, also provides an opportunity for quality control. Any break or rupture in the membrane should result in the production of readily visible bubbles.

While for most intended applications, the membrane will be produced to exclude molecules having a molecular weight larger than about 10,000 to 20,000, the membrane can be produced to exclude even smaller molecules.

The solvent that is used for the casting solution may be any one of several well-known solvents for the purpose or any mixture thereof that produces acceptable results. For the polycarbonates, a solvent such as N,N'-dimethylformamide (DMF) may be used. DMF is also useful for polyvinyl chloride resins, and for the polyacrylates. Dimethylsulfoxide, dimethylacetamide, and many other solvents are also useful. In addition to being a good solvent for the polymer, the solvent that is selected for the casting solution must be miscible with the liquid that is selected for use in the formation bath, which should not be a solvent for the polymer. The preferred formation bath liquid is water because of its convenience, but the lower alcohols or aqueous solutions of the lower alcohols are also useful.

Units constructed in accordance with the invention are useful for all of the applications for which the immersible molecular separator unit of Emmer and Good is useful. These units are easily cleaned for reuse with sodium hypochlorite solutions, or with several of the well-known detergents. Sterilization can be accomplished with ethylene oxide or other similar sterilizing materials.

In designing immersible molecular filtration units, the length of the porous body can be selected to be any convenient, practical length. Generally, the longer the unit, the greater will be the rate of filtration, and therefore the shorter the time required for a particular operation. For many filtration separations where the liquid to be processed will be in a test tube, a length in the range from about one and one-half inches to four inches will be found suitable, with a length of about three inches representing a practical selection. Similarly, the larger the diameter of the unit, the greater is the effective filtration area. However, the membrane must always, where possible, be spaced from the wall of the test tube or other vessel, since any contact between the membrane and the vessel wall produces a dead or inactive region. Optimum results are obtained when the design of the unit is such that there is uniform spacing everywhere between the active surface of the membrane and the wall of the container in which it is placed.

In one preferred way of making a unit of the kind shown in FIGS. 3 and 4, the casting solution is a 20% solution of a polyether sulfone resin in dimethyl sulfoxide, having a viscosity of 950 centipoises at 22° C. When units of this kind are made by a mass production technique using a manifold on which several units are mounted, all of the thus-mounted units can be dipped in the lacquer simultaneously, with above five seconds of immersion being adequate. After a short period to allow drainage, the units are preferably inverted and rotated to allow the lacquer to drain back and distribute evenly. They are then plunged rapidly into an aqueous solution of 0.02% Tergitol 15-S-7 (a wetting agent) for membrane formation, and are left in this solution for about ten minutes. The units are then transferred to a water tank and rinsed to remove residual solvent by applying vacuum and drawing an average of 40 milliliters of water through each unit. The units are then pressure tested at 10 psig, by applying air pressure to the inside surface of the membrane while immersed in an aqueous bath containing 10% glycerine and 0.05% formaldehyde, in order to permit the detection of any pin hole leaks. After transferring the units, still mounted on the manifold, to a second aqueous bath containing 10% glycerine and 0.05% formaldehyde, vacuum is again drawn for several minutes, to insure that the membranes are thoroughly filled with glycerine, for stabilization. The units are then removed from the manifold, allowed to air dry, and are packaged.

Upon testing, units produced by this technique have been found to pass 50% cytochrome-C, while rejecting 99+% hemoglobin.

The term "permeable" is used herein in a generic sense to refer to microporous membranes as well as to semi-permeable, anisotropic membranes.

CONCLUSION

While the invention has been disclosed by reference to the details of preferred embodiments thereof, it is to be understood that such disclosure is intended in an illustrative rather than in a limiting sense, and it is contemplated that various modifications in the compositions and processing techniques, in particular, for making units in accordance with the invention, will readily occur to those skilled in the art, within the spirit of the invention and the scope of the appended claims.

What is claimed is:

1. A lightweight, laboratory-scale immersible filter unit shaped and dimensioned for insertion in a liquid-containing fluid sample in a test tube or similar laboratory scale container, comprising:

an elongate microporous base member having a substantially uniform and continuous transverse section of microporous character with a network of intercommunicating micropores;

a tubular conduit member connected to said base member, said conduit member being formed with a fluid-impervious body and with a bore that communicates with the intercommunicating porous network of the base member, said conduit member being adapted to be connected to a vacuum source, and a permeable membrane disposed directly on, engaged against, and substantially coextensive with the entire exposed external surface of said microporous base member, without penetration of the material of the membrane into the intercommunicating porous network of the microporous base;

said permeable membrane being formed with an integral collar portion thereof engaged against the confronting underlying surface portion of said conduit member, said collar portion having a surface confronting and engaged against an underlying surface of the conduit member and being secured to said conduit member in substantially fluid-tight fashion, the unit being sufficiently light in weight to permit its handling by the conduit member without contact with the membrane, whereby the unit can be immersed in a liquid-containing fluid sample in a test tube or similar laboratory-scale container with the fluid completely covering the exposed outer surface of said membrane and, if desired, covering a portion of the conduit member, so that liquid passage through the device can occur through those portions of the membrane that are directly engaged against an underlying surface of said microporous body member, whereby upon the immersion of the membrane portion of the unit in a liquid-containing fluid sample, and upon the application of suction to the bore of said conduit member, liquid can be drawn through said membrane and the intercommunicating network of pores of said base member into said conduit, thereby filtering said liquid.

2. A filter unit in accordance with claim 1 wherein the microporous base member is formed from sintered particles of polyethylene, and wherein the microporous base member has a bulk density below about 0.6 gms./cm.$^3$, and the mean pore size of the base is in the range from about 20 micrometers to about 60 micrometers, and wherein said permeable membrane is a highly anisotropic hydrophilic membrane.

3. An immersible molecular filter unit in accordance with claim 1 wherein said microporous base member is an essentially rigid, generally cylindrical, polymeric body having rounded ends, said body being generally free from sharp edges and being formed with a cylindrical bore extending generally axially of the body into its interior from one end thereof, the pores in said body having an average size in the range from about 20 micrometers to about 60 micrometers, wherein said conduit member is a polymeric tubular member that is snugly inserted in said bore and that has a portion thereof projecting from said bore and extending away from said body, and wherein said membrane has a thickness not exceeding about 300 micrometers.

4. A filter unit in accordance with claim 3 wherein the membrane is a highly anisotropic, hydrophilic membrane and the porous body is formed from sintered polyethylene that has a bulk density below about 0.6 gms./cm.$^3$, and the mean pore size of said sintered polyethylene body is in the range from about 20 micrometers to about 60 micrometers.

5. An immersible molecular filter unit in accordance with claim 1 wherein said microporous base member is generally cylindrical in shape and has at least one rounded end, and wherein said conduit member is in the form of a cap-like structure that is seated on one end of said base member remote from a rounded end thereof, said cap-like conduit member being formed with an upright projecting stem in which said bore is formed, for communication with the porous network of the base member, and wherein said membrane is a highly anisotropic hydrophilic membrane.

6. An immersible filter unit in accordance with claim 1, wherein the base member is formed of sintered polyethylene and has a pore size up to about 100 micrometers and a bulk density below about 0.5 gm./cm.$^3$, and wherein the membrane is a highly anisotropic hydrophilic membrane and the size of the molecules retained by the membrane has a nominal molecular weight limit in the range from about 10,000 to about 20,000.

7. A process for making an immersible filter unit in accordance with claim 1, comprising:

assembling the base member and the conduit member in operative relation;

dipping said assembly in a polymer casting solution having a viscosity in the range from about 500 cps to about 5,000 cps, under conditions such that there is essentially no penetration of the casting solution into the intercommunicating porous network of the base member, to form a coating directly on the exposed external surface of the base member with an integral collar portion extending about at least the part of the conduit member adjacent the base member;

then promptly immersing the dip-coated assembly in a formation bath containing a liquid that is not a solvent for the polymer in the casting solution but that is miscible with the solvent in the casting solution, to cause the formation of an anisotropic membrane, and then passing the formation bath liquid through the membrane to extract any remaining casting solvent from the formed membrane.

8. A process in accordance with claim 7 in which the dip coating as applied shrinks during the membrane formation process, for frictional engagement of the formed membrane with the microporous base member and of its collar portion conduit with the member.

9. A process for making an immersible molecular filter unit in accordance with claim 1 comprising:

assembling a microporous body of generally cylindrical shape and a conduit member in operative relation, with the conduit member communicating with the porous network of the microporous body, dipping said assembly in a polymer casting solution having a viscosity in the range from about 500 cps to about 5,000 cps, under conditions such that there is essentially no penetration of the casting solution into the porous network of the porous body of the base member, to immerse the entire porous body therein together with at least a portion of the conduit member, to coat the entire surface area that is immersed, of both the porous body and the connector member, with a layer of the casting solution, thus forming a collar portion about the conduit member, which collar portion is integral with the coating over the porous body, immersing the coated assembly to submerge the entire coating in a formation bath containing a liquid that is not a solvent for the polymer in the casting solution but that is compatible with the solvent in the casting solution, to convert the coating to an anisotropic hydrophilic member, and then, after the anisotropic structure has been fully formed, applying a vacuum through the conduit member to draw formation bath liquid through the membrane and the porous body, to extract residual solvent from the membrane.

10. A process for encasing in a highly anisotropic, permeable membrane an assembly of a microporous base member having an internal network of intercommunicating pores and a fluid-impervious conduit member connected to the base member, said conduit member being formed with a tubular bore that extends away from said base member and that communicates with the intercommunicating porous network of the base member, to permit use of the membrane as a separator that is supported by the microporous base member, by immersion of the encased assembly in a liquid, comprising:

juxtaposing a microporous base member and a conduit member that is formed with a non-porous body and with the tubular bore extending in said member away from said porous body, with the bore of the conduit in communication with the intercommunicating network of pores of the body;

applying a continuous coating of a polymer casting solution directly upon and over the entire exposed external surface of the microporous body and over an adjacent portion of the conduit member, to form a collar about said conduit member that is integral with the coating on said microporous base member body, the casting conditions including the viscosity of the casting solution and the porosity of the body of the microporous member being selected to avoid penetration of the casting solution into the intercommunicating network of pores of the microporous member, and converting said coating, including the collar portion thereof, to a hydrophilic, anisotropic membrane that is secured to said assembly of the juxtaposed microporous base member and conduit member in liquid-tight fashion.

11. A process in accordance with claim 10 wherein the microporous body is formed from sintered polyethylene and has a bulk density below about 0.5 gm./cm.$^3$, and wherein the membrane has a molecular exclusion characteristic defined as a nominal molecular weight limit of from about 10,000 to about 20,000.

* * * * *

UNITED STATES PATENT AND TRADEMARK OFFICE
CERTIFICATE OF CORRECTION

PATENT NO.   : 4,184,963

DATED        : January 22, 1980

INVENTOR(S)  : Shmuel Sternberg

It is certified that error appears in the above—identified patent and that said Letters Patent is hereby corrected as shown below:

Sheet 1 of the 2 sheets of drawings should be deleted to appear as per attachment.

*Signed and Sealed this*

*Tenth* Day of *June 1980*

[SEAL]

*Attest:*

SIDNEY A. DIAMOND

*Attesting Officer*   *Commissioner of Patents and Trademarks*

Fig. 1

Fig. 2